(12) United States Patent
Droulez

(10) Patent No.: US 6,682,119 B1
(45) Date of Patent: Jan. 27, 2004

(54) SEALING DEVICE BETWEEN A PARTITION AND A FITTING SET IN FRONT OF AN OPENING FORMED IN THE PARTITION

(75) Inventor: Eric Droulez, Trappes (FR)

(73) Assignees: Valeo, Paris (FR); Visteon Systemes Interieurs, La Defense Cedex (FR)

(*) Notice: Subject to any disclaimer, the term of this patent is extended or adjusted under 35 U.S.C. 154(b) by 53 days.

(21) Appl. No.: 10/019,502

(22) PCT Filed: Jun. 30, 2000

(86) PCT No.: PCT/FR00/01846

§ 371 (c)(1),
(2), (4) Date: May 30, 2002

(87) PCT Pub. No.: WO01/02201

PCT Pub. Date: Jan. 11, 2001

(30) Foreign Application Priority Data

Jun. 30, 1999 (FR) .............................. 99 08734

(51) Int. Cl.[7] ........................ B62D 25/14; B60K 37/04
(52) U.S. Cl. ...................... 296/39.3; 296/208; 296/70
(58) Field of Search ............................ 296/37.12, 39.1, 296/39.3, 70, 208, 211

(56) References Cited

U.S. PATENT DOCUMENTS

| 2,873,953 A | 2/1959 | Thorne | 257/7 |
|---|---|---|---|
| 5,326,615 A | * 7/1994 | Tsuchihashi et al. | 428/116 |
| 5,527,081 A | * 6/1996 | Rausch et al. | 296/186 |
| 5,685,595 A | * 11/1997 | Nishijima et al. | 296/70 |
| 5,714,227 A | 2/1998 | Sugawara et al. | 428/71 |
| 5,762,395 A | * 6/1998 | Merrifield et al. | 296/203.01 |
| 5,824,974 A | * 10/1998 | Campbell | 181/290 |
| 6,070,928 A | * 6/2000 | Campbell | 296/39.3 |
| 6,155,636 A | * 12/2000 | Stehning et al. | 296/214 |
| 6,409,590 B1 | * 6/2002 | Suzuki et al. | 454/143 |
| 2003/0091806 A1 | * 5/2003 | Staelgraeve et al. | 428/297.4 |

FOREIGN PATENT DOCUMENTS

| EP | 0 328 430 | 8/1989 | |
| EP | 0 456 531 A1 | 11/1991 | |
| JP | 57147970 | * 9/1982 | 296/39.3 |

* cited by examiner

*Primary Examiner*—Stephen T. Gordon
*Assistant Examiner*—Paul Chenevert
(74) *Attorney, Agent, or Firm*—Young & Thompson

(57) ABSTRACT

A sealing device between an element (1) partitioning two separate zones (A, B) and a specific fitting (2) set in front of an opening (3) provided in the partition (1) against one of its faces housing a soundproof lining (4) so as to allow communication between zones (A, B) through the fitting (2) via a sealing joint. The sealing joint is formed by the extension (4a) of the soundproof lining (4) itself, extending towards the peripheral edges (3b) delimiting the opening (3) of the partition (1) and by such value as to enable an integral peripheral contact with a peripheral zone (2a) of the fitting (2) to be installed.

4 Claims, 1 Drawing Sheet

US 6,682,119 B1

SEALING DEVICE BETWEEN A PARTITION AND A FITTING SET IN FRONT OF AN OPENING FORMED IN THE PARTITION

FIELD OF THE INVENTION

The present invention relates to a device for sealing between an element for partitioning two separate regions and a given fixture placed in front of an aperture formed in the said partition.

BACKGROUND OF THE INVENTION

In certain fields, such as that of motor vehicles, it is often sought to achieve sealing of fixtures fixed onto support partitions by way of a sealing gasket arranged on the periphery of the aperture of the partition and against which the corresponding periphery of the fixture will be applied, the fixture being intended to pass through the said aperture in such a way as to allow communication between the said regions which are arranged on either side of the partition.

It is in this way that the air-distribution units for heating, ventilation and air-conditioning (HVAC) are fixed onto a partition, constituting an interface or bulkhead, generally produced from sheet metal, and arranged between the passenger cabin of a motor vehicle and an engine compartment.

In this way, sealing is provided for the air inlet or outlet between the passenger cabin of the vehicle and the outside.

In a way which is also known, this type of gasket is obtained by cutting-out from polyurethane foam which is then bonded onto the components.

Furthermore, it is also known to soundproof at least one of the sides of the metal interface or bulkhead by application of a soundproofing coating.

In the region of the aperture which is intended for installation of the air-distribution unit for heating, ventilation and air-conditioning, it is known to form a cut-out, in the soundproofing coating, the cut-out having dimensions greater than those of the aperture so as to clear the periphery thereof and to allow application of a sealing gasket interposed between a peripheral region of the aperture, left free, and a corresponding region of the fixture to be fixed, in this instance to a heating- and ventilation-air distributor.

The prior art which has just been cited is illustrated in FIG. 1, where a fixture a is seen which is applied against a bulkhead b by way of a gasket made of polyurethane foam c arranged around an aperture d of the bulkhead b, the latter moreover having received a soundproofing coating e in which an aperture f has been formed so as to allow the application of the gasket c against the bulkhead b. The soundproofing coating e is also made of polyurethane, but coated on its visible face with a skin of dense rubber g.

It will easily be understood that such a way of working exhibits a fair number of drawbacks, one of them being caused by the fact that, with the soundproofing coating being cut out over dimensions which are much larger than those of the aperture d of the partition b, a non-soundproofed region results between the gasket c and the soundproofing coating e, this non-soundproofed region consisting, to be exact, of the aperture f formed in the coating e.

Moreover, this solution implies not only the manufacture of a separate gasket but also a supplementary handling operation consisting in coating it with adhesive and putting it in place on the duct a.

Another drawback lies in the fact that an affixed gasket is always subject to leaks.

Another important drawback resulting from the prior art in this field consists in the fact that the technical definition and the responsibility for production of the soundproofing coating lay with whoever assembled the bulkhead onto the vehicle, whereas those for the sealing gasket lay with whoever assembled the air-distribution unit for heating, ventilation and/or air-conditioning. This separation of the functions requires coordination of the activities of each of the participants, which is not an easy matter.

SUMMARY OF THE INVENTION

According to a first phase of the inventive step, it has been observed that, in fact, the soundproofing coating mentioned above was generally made up of a thickness of polyurethane foam, that is to say of a substance identical to that of the sealing gasket affixed between the unit and the periphery of the aperture deliberately left clear, the only difference between the two materials constituting, on the one hand, the gasket and, on the other hand, the soundproofing coating, lying in the fact that the latter, on its free face opposite its face for contact with the bulkhead, includes a skin of dense rubber with a thickness of about two millimetres constituting a heavy mass, intended to form a high-frequency vibration filter.

These latter observations, associated with those mentioned above, led to a solution to the problems posed and which have just been cited.

To that end, the invention relates to a device for sealing between an element for partitioning two distinct regions and a given fixture, placed in front of an aperture formed in the partition, against one of its faces receiving a soundproofing coating, in such a way as to allow communication between the said regions through the fixture, by way of a sealing gasket, characterised in that the said sealing gasket consists of an extension of the soundproofing coating itself, in the direction of the peripheral edges delimiting the aperture of the partition and with a value such as to allow integral peripheral contact with a peripheral region of the fixture to be put in place.

The present invention also relates to the characteristics which will emerge in the course of the description which will follow, and which should be considered in isolation or in all their possible technical combinations.

BRIEF DESCRIPTION OF THE DRAWINGS

This description, given by way of non-limiting example, will give a good understanding of how the invention can be implemented, by reference to the attached drawings, in which.

DESCRIPTION OF THE PREFERRED EMBODIMENTS

Figure 1:
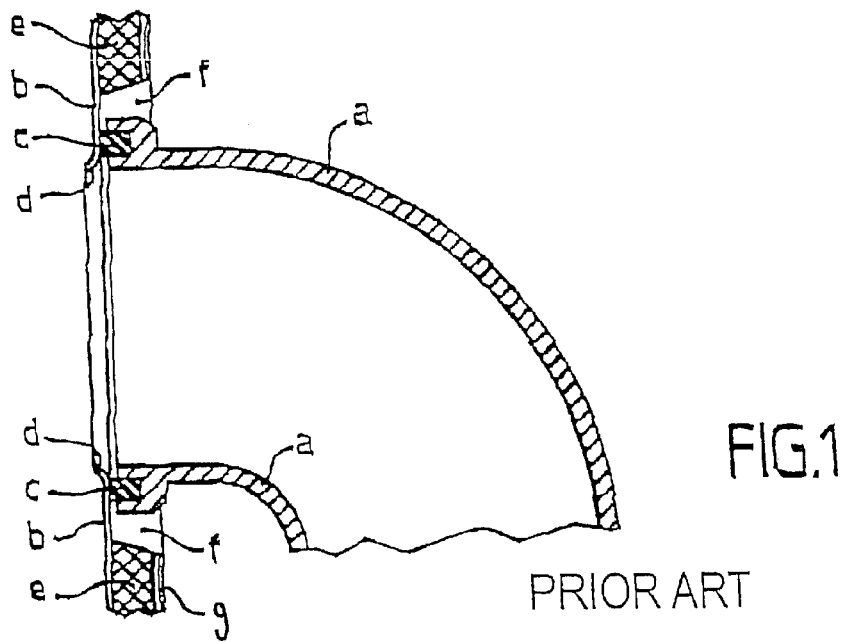
FIG. 1 diagrammatically represents a device for sealing between a partitioning element and a fixture, according to the prior art set out previously.
Figure 2:
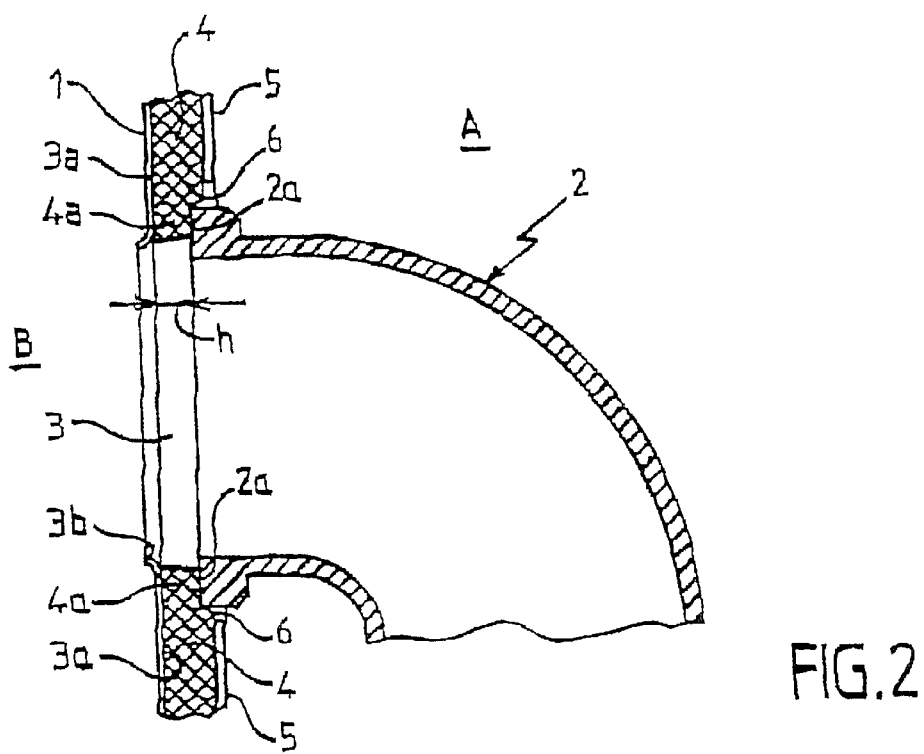
FIG. 2 represents a device for sealing between a partitioning element and a fixture, according to the invention.

By way of illustrated example, represented in FIG. 2, the sealing device according to the invention is arranged between an element 1, for partitioning two distinct regions A and B, and a given fixture 2.

The fixture 2 is placed in front of an aperture 3 formed in the partition 1, against one of the faces thereof receiving a soundproofing coating 4. In this way, the regions A and B are put into communication with each other through the fixture 2, the latter especially interacting with the periphery 3a of the aperture 3 by way of an extension 4a of the soundproofing coating 4 itself, so as to constitute a sealing gasket.

The extension 4a of the soundproofing coating 4 extends towards the peripheral edges 3b delimiting the aperture 3 of the partition 1 with a value such as to allow integral peripheral contact with a peripheral region 2a of the fixture 2 to be put in place.

According to another characteristic of the invention, the soundproofing coating 4 consists of a lightweight polyurethane foam, absorbing the low-frequency vibration, in contact with the partition 1, its visible outer face being coated with a skin, especially of dense elastomer 5, of heavy weight, forming a high-frequency vibration filter, this skin 5 being taken off the soundproofing coating 4 in the region 2a around the aperture 3 of the partition 1, corresponding to the gasket-forming part 4a.

In this way, the said gasket particularly consists exclusively of polyurethane foam, coming into contact with the peripheral region 2a of the fixture 2.

In fact, the peripheral region 4a of the gasket-forming soundproofing coating 4 consists of a recessed frame 6 obtained by breaking through the skin 5 so as to uncover the polyurethane foam, in order to obtain a gasket of predetermined thickness "h".

It will be clearly understood that, in this way, not only is the distinct discontinuity of a gasket avoided but, likewise, no interruption is created between the soundproofing coating 4 and the fixture 2, as with the prior art.

According to one particularly advantageous example application of the invention, the partition 1 onto which the soundproofing coating 4 is applied constitutes an interface produced from sheet metal arranged between a passenger cabin A of a motor vehicle and an engine compartment B. This interface will constitute a bulkhead, or a lower transverse subframe, as the case may be.

Likewise, according to one advantageous application example, the fixture 2 arranged on the partition 1 constituting an interface is an air distributor for heating, ventilation and/or air-conditioning.

What is claimed is:

1. Device for sealing between an element for partitioning two distinct regions and a given fixture, placed in front of an aperture formed in the partition, against one of its faces receiving a soundproofing coating, in such a way as to allow communication between the regions through the fixture, by way of a sealing gasket, wherein said sealing gasket consists of an extension of the soundproofing coating itself, extending in the direction of the peripheral edges delimiting the aperture of the partition and with a value such as to allow integral peripheral contact with a peripheral region of the fixture to be put in place, and wherein the soundproofing coating consists of a lightweight polyurethane foam, absorbing the low-frequency vibration, in contact with the partition, its visible outer face being coated with a skin of dense elastomer, of heavy weight, forming a high-frequency vibration filter, this skin being taken off the soundproofing coating in the region around the aperture of the partition, corresponding to the gasket-forming part, in such a way that the gasket consists exclusively of polyurethane foam, coming into contact with the peripheral region of the fixture.

2. Device according to claim 1, wherein the peripheral region of the gasket-forming soundproofing coating consists of a recessed frame obtained by breaking through the skin so as to uncover the polyurethane foam, in order to obtain a gasket of predetermined thickness.

3. Device according to claim 1, wherein the partition onto which the soundproofing coating is affixed constitutes an interface produced from sheet metal arranged between a passenger cabin of a motor vehicle and an engine compartment and constituting a bulkhead or a lower transverse subframe.

4. Device according to claim 3, wherein the fixture arranged on the partition constituting an interface is an air distributor for heating and/or ventilation and/or air-conditioning.

* * * * *